US010856360B1

(12) United States Patent
Sun et al.

(10) Patent No.: US 10,856,360 B1
(45) Date of Patent: Dec. 1, 2020

(54) SYSTEM AND METHOD FOR SHARING MULTI-ACCESS EDGE COMPUTING RESOURCES IN A WIRELESS NETWORK

(71) Applicant: Verizon Patent and Licensing Inc., Arlington, VA (US)

(72) Inventors: Dan Sun, Bridgewater, NJ (US); Manuel Enrique Caceres, Basking Ridge, NJ (US); Taussif Khan, Martinsville, NJ (US); Samuel Charles Mindlin, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/421,042

(22) Filed: May 23, 2019

(51) Int. Cl.
*H04W 80/10* (2009.01)
*H04L 12/24* (2006.01)
*G06F 16/182* (2019.01)

(52) U.S. Cl.
CPC ........ *H04W 80/10* (2013.01); *G06F 16/1824* (2019.01); *H04L 41/20* (2013.01); *H04L 41/5019* (2013.01)

(58) Field of Classification Search
None
See application file for complete search history.

(56) References Cited

U.S. PATENT DOCUMENTS

| | | | | |
|---|---|---|---|---|
| 2019/0140919 A1* | 5/2019 | Smith | ................... | H04L 67/10 |
| 2019/0140933 A1* | 5/2019 | Guim Bernat | .......... | H04L 43/08 |
| 2019/0220703 A1* | 7/2019 | Prakash | ................... | G06N 3/08 |
| 2020/0007414 A1* | 1/2020 | Smith | ................... | H04L 67/322 |
| 2020/0125389 A1* | 4/2020 | Palermo | ................ | G06F 9/5027 |
| 2020/0195495 A1* | 6/2020 | Parker | ................... | H04L 9/3239 |
| 2020/0228880 A1* | 7/2020 | Iyer | ................... | H04N 21/23418 |
| 2020/0229038 A1* | 7/2020 | Zhu | ....................... | H04W 28/10 |

OTHER PUBLICATIONS

Giust et al., "ETSI White Paper No. 24—MEC Deployments in 4G and Evolution Towards 5G" First edition, Feb. 2018, 24 pages.
ETSI "Multi-access Edge Computing (MEC); Framework and Reference Architecture", ETSI GS MEC 003 V2.1.1, Jan. 2019, 21 pages.

\* cited by examiner

*Primary Examiner* — Eunsook Choi (57) ABSTRACT

An orchestration device may receive a request to register available multi-access edge computing (MEC) resources to be shared with a network operator. For example, the available MEC resources may be provided by a provider operating a MEC host located in an edge region of a radio access network (RAN) associated with the network operator. The orchestration device may receive information related to a requested MEC session to support an application workload for a user equipment in communication with a base station located in the edge region of the RAN and assign at least a portion of the application workload to the MEC host based on a profile for the MEC host and a service level agreement specifying one or more performance requirements associated with the application workload. Accordingly, the orchestration device may cause the portion of the application workload to be transmitted to the MEC host.

20 Claims, 8 Drawing Sheets

SYSTEM AND METHOD FOR SHARING MULTI-ACCESS EDGE COMPUTING RESOURCES IN A WIRELESS NETWORK

BACKGROUND

In a multi-access edge computing (MEC) environment, computing is enabled by a network architecture that provides computing capabilities, to a user device, via computing platforms at or near an edge of a network (e.g., a wireless communication network). Accordingly, because a MEC environment may provide computing at or near the edge of the network, increased performance may be achieved over networks in which computation is performed topologically and/or physically further from a user device. For example, the MEC may offer the performance increase due to less traffic and/or congestion between the user device and the computing node(s), less latency (due to the closer proximity to the user device), increased flexibility (due to a greater amount of computing node(s)), and/or the like.

DETAILED DESCRIPTION OF PREFERRED EMBODIMENTS

The following detailed description of example implementations refers to the accompanying drawings. The same reference numbers in different drawings can identify the same or similar elements.

Some application workloads on a user equipment can generate substantial amounts of data, and processing the data can be computationally intensive. The user equipment may have a limited ability to process the data associated with the application workloads due to limited computational resources available on the user equipment. Moreover, performing such computationally intensive processing at the user equipment can significantly increase energy consumption of the user equipment, which in turn can result in reduced battery life for the user equipment. In some circumstances, processing data associated with an application workload on a user equipment device may be offloaded onto an application server (e.g., an application server operating in a cloud computing environment) or other computing resources.

In this way, an application client on the user equipment generates the data associated with the application workload, the user equipment transmits the data to the application server via a data network such as the Internet, and the application server processes the data before the processed data is returned to the user equipment via the data network. While offloading the processing of the data to the application server conserves processing and battery resources on the user equipment, transmitting large amounts of data through a data network can increase latency because the data has to travel further (in terms of both round trip time and distance) before the data is processed. As a result, offloading data to an application server, either in a remote location or in the cloud, can be impractical for some application workloads, such as application workloads that rely on real-time data processing, have low-latency requirements, have high bandwidth requirements, and/or the like (e.g., application workloads that relate to autonomous vehicles, augmented reality, virtual reality, multi-player gaming, remote monitoring, sensor networks, content delivery, machine learning, virtual desktops, video conferencing, and/or the like).

In some cases, rather than having a user equipment offload data to an application server, the data can be processed using a geographically distributed architecture referred to as multi-access edge computing (MEC). In the distributed MEC architecture, computing nodes can be geographically distributed across a network (e.g., a data network, a core network, a radio access network, and/or the like), and the data can be offloaded to one or more computing nodes in the network that are closest to the user equipment. The computing nodes that are closest to the user equipment (e.g., in terms of distance, latency, and/or the like) can process the data and transmit a result of the processing to the user equipment. In this way, the latency and/or distance the data travels is reduced, which results in lower latencies, reduced usage of backhaul communication bandwidth, and/or the like. However, implementing a MEC architecture to provide broad geographic coverage can involve introducing large amounts of computing nodes into a network. As a result, implementing a MEC architecture involves significant resources to provision hardware servers across a geographic area, as well as costs associated with deploying, operating, and maintaining the hardware servers.

Some implementations described herein may provide a MEC orchestration platform that enables a network operator to aggregate MEC resources that the network operator provides in an edge region of a radio access network (RAN) with MEC resources that one or more third-party providers donate, sell, lease, or otherwise share with the network operator. For example, the one or more third-party providers may be individual users, enterprises, other network operators, and/or the like that have excess unused compute power, specialized computing resources, and/or other available compute resources, which may be donated, sold, leased, or otherwise shared with the network operator to supplement or provide MEC resources in the edge region of the RAN. Accordingly, when a user equipment located in the edge region of the RAN requests a session to support an application workload that may benefit from computation at an edge node (e.g., an application workload having a low-latency requirement, a high-bandwidth requirement, and/or the like), the MEC orchestration platform may utilize the MEC resources shared by the one or more third-party providers (e.g., when the MEC resources that the network operator provides in an edge region are insufficient to support the application workload, when the network operator does not have any MEC resources deployed in the edge region, and/or the like).

In this way, when the one or more third-party providers have available computing resources with unused capacity, specialized processing capabilities (e.g., graphics processing), and/or the like, the available computing resources may be shared with the network provider, which increases efficiency and/or utilization of computing capacity within the edge region. Furthermore, in this way, the network provider can offer low-latency service, high-bandwidth service, and/ or the like to support performance requirements associated with an application workload requested by a user equipment even in geographic areas where the network provider may have insufficient MEC resources to otherwise support the performance requirements associated with the application workload. In this way, by enabling certain application workloads to be processed using computing resources located in the edge region (e.g., in physical proximity to the user equipment), performance is improved for the application workloads, backhaul capacity is increased by reducing a signal load in a core network, network congestion and/or data bottlenecks are reduced, infrastructure and operational costs are reduced, and/or the like.

FIGS. 1A-1D are diagrams of one or more example implementations 100 described herein. As will be described in further detail herein, example implementation(s) 100 may include a set of base stations located in an edge region of a radio access network (RAN) associated with a network operator, a set of multi-access edge computing (MEC) hosts provided by the network operator in the edge region of the RAN, a set of shared MEC hosts that are located in the edge region and operated by one or more third-party providers, and a set of user equipments that may be in communication with one or more of the base stations located in the edge region of the RAN. In some implementations, example implementation(s) 100 may further include a MEC orchestration platform that may enable the shared MEC hosts to register available MEC resources to be shared with the network operator. Accordingly, if the set of MEC hosts provided by the network operator in the edge region of the RAN are insufficient to support one or more application workloads requested by one or more of the user equipments, the MEC orchestration platform may utilize available MEC resources associated with the shared MEC hosts to support the one or more application workloads.

Figure 1A:
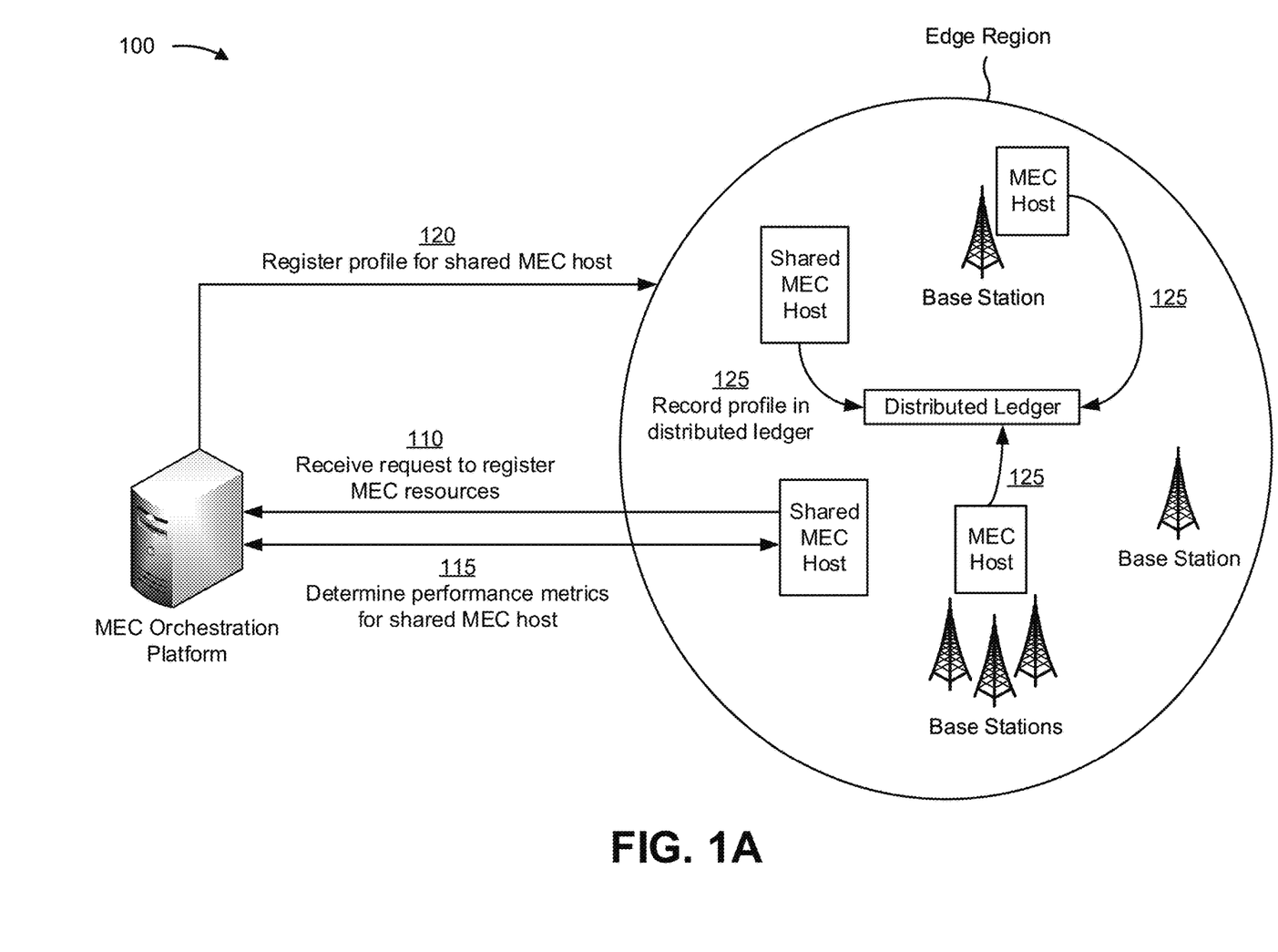
FIGS. 1A-1D are diagrams of one or more example implementations described herein.
Figure 1B:
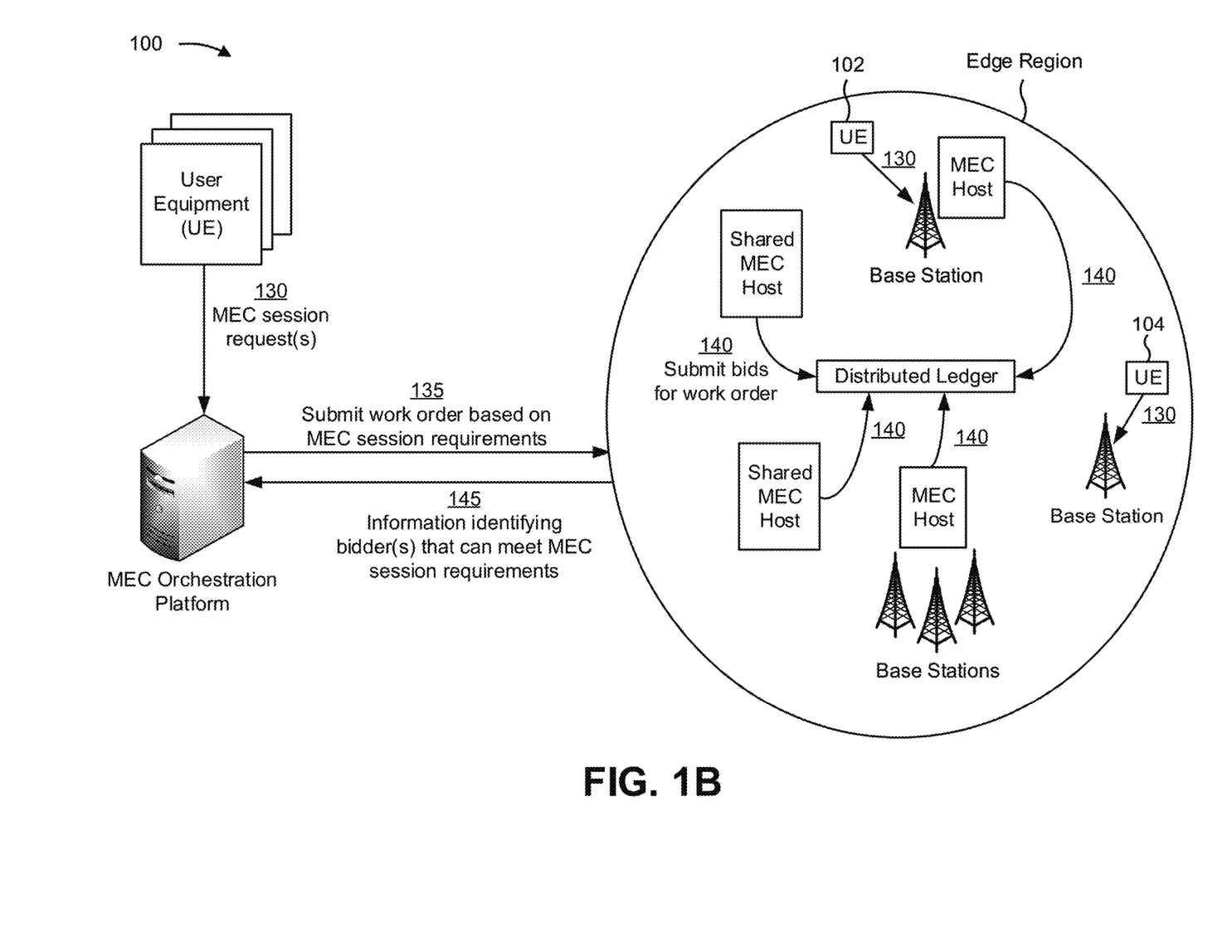
Figure 1C:
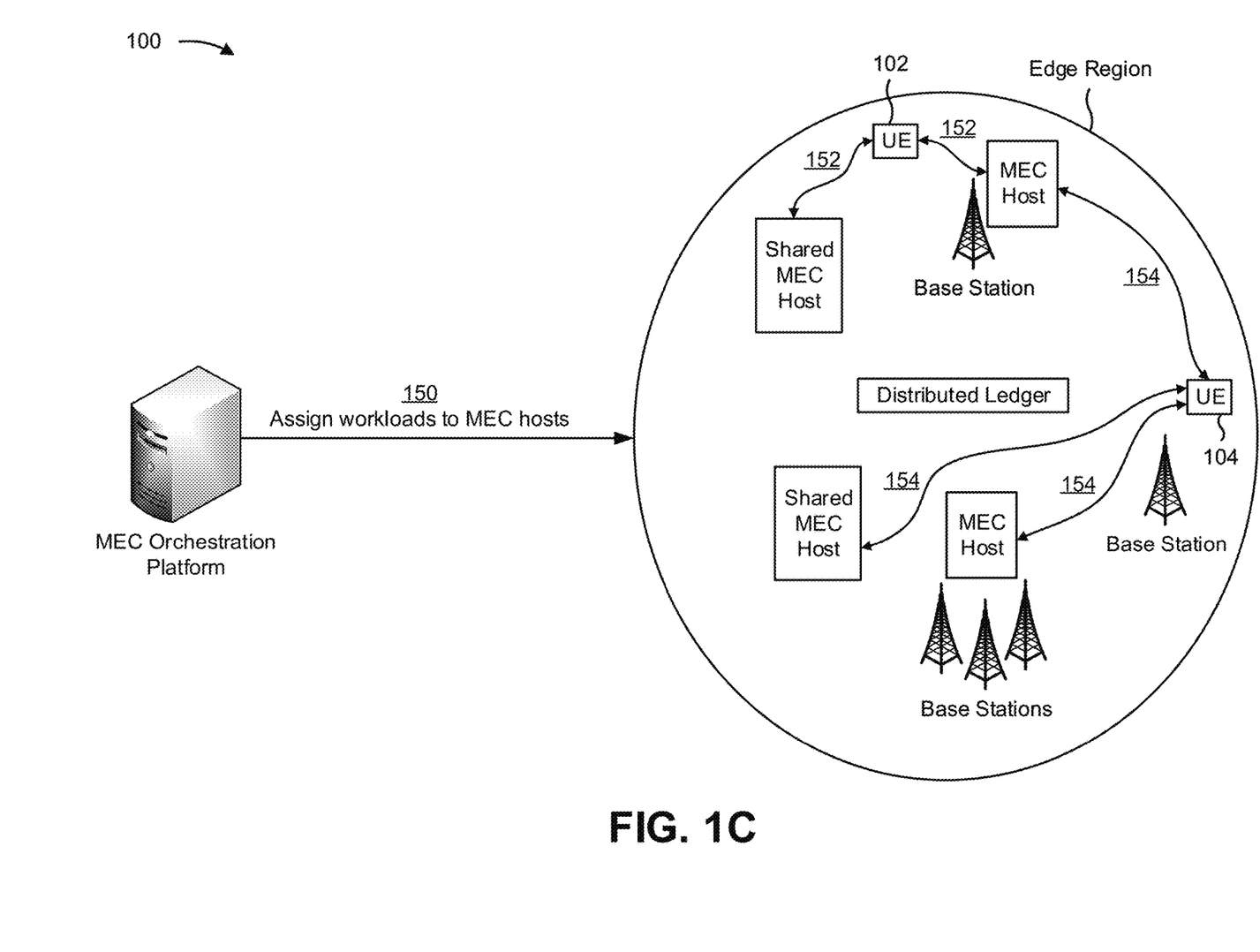
Figure 1D:
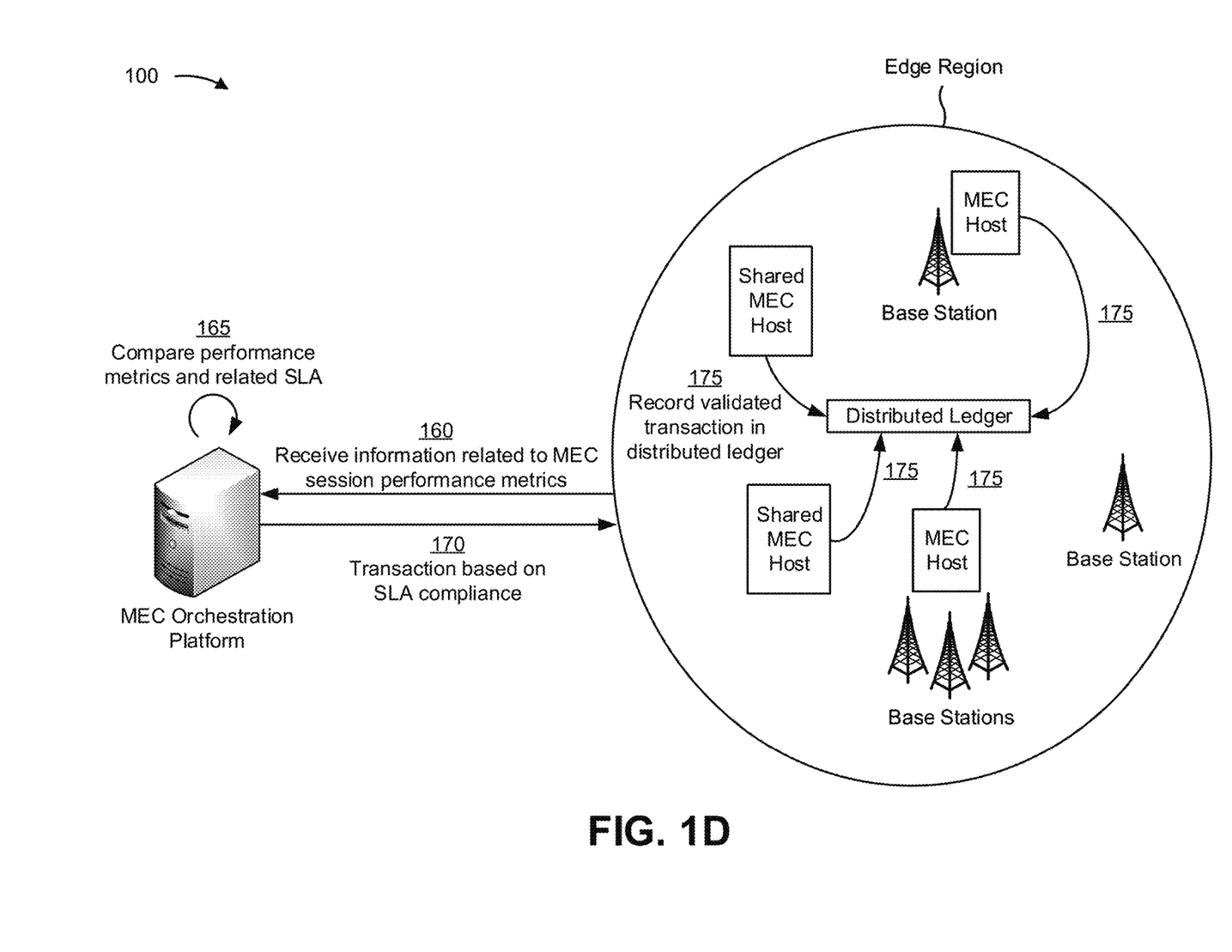

For example, as shown in FIG. 1A, the shared MEC hosts may communicate with the MEC orchestration platform to register available MEC resources to be shared with the network provider, and the MEC orchestration platform may cause a profile for each of the shared MEC hosts to be registered (e.g., in a local data storage device, a distributed ledger that is replicated, shared, and synchronized among the MEC hosts and the shared MEC hosts located in the edge region of the RAN, and/or the like) based on one or more performance metrics for the shared MEC hosts. As shown in FIG. 1B, the MEC orchestration platform may receive information related to one or more MEC sessions that are requested by the user equipments and manage the allocation, access, management, and/or coordination of the requested MEC sessions across the MEC hosts and/or the shared MEC hosts located in the edge region of the RAN (e.g., based on a bidding or auction process in which the MEC orchestration platform may submit a work order related to the requested MEC session(s) to the MEC hosts and the shared MEC hosts located in the edge region, which may submit bids for the work order based on profile information contained in the distributed ledger). As shown in FIG. 1C, the MEC orchestration platform may assign one or more application workloads associated with the requested MEC session(s) across the MEC hosts and/or the shared MEC hosts located in the edge region of the RAN. As shown in FIG. 1D, the MEC orchestration platform may monitor performance of the application workloads and use the monitored performance to process one or more transactions for the application workloads (e.g., based on performance metrics, compliance with a service level agreement, and/or the like).

In some implementations, each MEC host provided by the network operator and/or shared MEC host having MEC resources that are available to share with the network operator may include a MEC environment and a virtualization infrastructure that provides various computing resources (e.g., processor resources, storage resources, network resources, and/or the like) for processing application workloads that can discover, advertise, consume, and/or offer MEC services. For example, the MEC environment can be used to execute one or more application workloads, which may be executed as one or more virtual machines, containers, and/or the like on top of the virtualization infrastructure. Accordingly, the application workloads executed in the MEC environment can interact with the computing resources associated with the MEC environment to consume and/or provide MEC services. In some implementations, the application workloads may further interact with the MEC environment to perform certain support procedures related to a lifecycle of the application workloads, such as indicating availability, preparing to relocate user state information (e.g., in a mobility scenario), and/or the like. In some implementations, the application workloads can be associated with a service level agreement specifying one or more rules and/or requirements associated with the application workloads (e.g., required resources, maximum latency, minimum bandwidth, required services, and/or the like), which may be validated and/or assigned by the MEC orchestration platform.

In some implementations, the MEC orchestration platform may include a system-level management component that may maintain an overall view of the MEC system (e.g., including the MEC hosts that are deployed in the MEC system, the MEC resources that are available in the MEC system, a topology of the MEC system, and/or the like) and one or more host-level management components that are configured to manage MEC functionality associated with a particular MEC host and one or more application workloads that are executing on the particular MEC host. For example, in some implementations, the system-level management component may select one or more MEC hosts to process an application workload based on one or more constraints or performance criteria (e.g., latency, bandwidth, location, available resources, available services, and/or the like) and communicate with the host-level management component(s) to trigger instantiation and/or termination of virtual machines, containers, and/or the like that are used to process the application workload. Accordingly, the host-level management component(s) may be configured to allocate, release, and/or otherwise manage virtualized resources (e.g., compute resources, storage resources, networking resources, and/or the like) of a particular MEC host, which may include preparing the virtualization infrastructure to run a software image, collecting and reporting performance and fault information about the virtualized resources, supporting relocation of application workloads, and/or the like. In some implementations, the host-level management component(s) may further manage a lifecycle of an application workload (including informing the system-level management component of relevant application related events), enforce rules and/or performance requirements specified in a service level agreement, receive fault reports and performance measurements from the virtualization infrastructure, and/or the like.

As shown in FIG. 1A, and by reference number 110, the MEC orchestration platform may receive a request to register a set of available MEC resources from a shared MEC host having a set of computing resources available to be shared with the network operator associated with the edge region of the RAN. For example, in some implementations, the MEC orchestration platform may provide a portal or other suitable interface that third-party providers can use to communicate with the MEC orchestration platform and indicate unused or excess compute resources (e.g., processing resources, storage resources, networking resources, and/or the like) that are available to be shared with the network operator. In some cases, when submitting the request to register the set of available MEC resources, the third-party provider may indicate one or more performance capabilities of the available MEC resources (e.g., a maximum latency, a minimum processing speed, security capabilities, specialty processing capabilities, and/or the like). Additionally, or alternatively, the third-party provider may indicate one or more periods during which the MEC resources are available to be shared with the MEC operator (e.g., for the next six months, for the next year, on certain days and/or at certain times, and/or the like).

As further shown in FIG. 1A, and by reference number 115, the MEC orchestration platform may be configured to determine one or more performance metrics for the shared MEC host. For example, the MEC orchestration platform may cause one or more test workloads to be executed on the shared MEC host, and the MEC orchestration platform may receive information (e.g., from the virtualization infrastructure on the shared MEC host) that indicates actual performance measurements related to latency, speed, bandwidth, and/or the like. In this way, the MEC orchestration platform may validate the information that the third-party provider indicated when submitting the request to register the available MEC resources, and/or independently benchmark the performance of the shared MEC host to determine whether the shared MEC host can satisfy performance requirements associated with application workloads to be processed using MEC resources. Accordingly, in some implementations, the MEC orchestration platform may determine whether the performance metrics for the shared MEC host satisfy a condition (e.g., based on whether an average or maximum latency satisfies a threshold value).

As further shown in FIG. 1A, and by reference number 120, the MEC orchestration platform may register a profile for the shared MEC host. For example, the MEC orchestration platform may include one or more storage devices to store information related to profiles for various MEC hosts that are available in the edge region of the RAN, including the MEC hosts that are provided by the network operator and/or shared MEC hosts that are operated by one or more third-party providers. In some implementations, the profiles may indicate one or more specialized processing capabilities associated with the corresponding MEC host. For example, in some cases, the shared MEC hosts may include compute resources that are used to perform blockchain mining operations, which are sometimes implemented using high-powered graphics processing units. Accordingly, certain application workloads that are graphics intensive (e.g., application workloads that relate to multi-player gaming, computer vision, augmented reality, and/or the like) and/or computationally intensive (e.g., application workloads that relate to machine learning algorithms, big data problems, and/or the like) may be processed more efficiently using MEC resources that include high-powered graphics processing units. Accordingly, the profiles that are registered for the shared MEC hosts may indicate whether the corresponding MEC host has any specialized processing capabilities for use in subsequently determining the optimal MEC host(s) to support a given application workload.

Furthermore, in some implementations, the profile that is registered for the shared MEC host may include information related to the one or more performance metrics for the shared MEC host. For example, the profile may indicate the performance capabilities that the third-party provider indicated when submitting the request to the MEC orchestration platform, benchmarking results obtained from the MEC orchestration platform causing the test workloads to be executed on the shared MEC host, and/or the like. In some cases, the MEC orchestration platform may register the profile for the shared MEC host only if the benchmarking results obtained from the MEC orchestration platform causing the test workloads to be executed on the shared MEC host satisfy one or more minimum performance requirements (e.g., to avoid onboarding MEC resources that may be insufficient to handle performance requirements associated with application workloads to be processed using MEC resources). In some implementations, the profiles for various MEC hosts may be associated with a heat map to show differences in computing power, charging rules, security policies, and/or the like for the various MEC hosts. In this way, the heat map can represent the capabilities of the various MEC hosts, which can be used to inform decisions regarding where to assign MEC application workloads.

As further shown in FIG. 1A, and by reference number 125, the MEC orchestration platform may broadcast a transaction to register the profile to existing MEC hosts in the edge region of the RAN registering the profile for the shared MEC host, and the existing MEC hosts in the edge region of the RAN may record the profile in a distributed ledger (e.g., a blockchain) according to a consensus protocol. For example, the distributed ledger may be a distributed database that is replicated, shared, and synchronized among multiple nodes (e.g., the existing MEC hosts in the edge region of the RAN) that communicate in a peer-to-peer manner, with each node independently replicating and saving an identical copy of the distributed ledger based on the consensus protocol. Each record in the distributed ledger may be secured against tampering and revision, and each record may represent or otherwise relate to a transaction (e.g., an exchange or transfer of information) that occurs in the network, thereby reducing or eliminating the need for a trusted and/or centralized administrator or storage facility for the distributed ledger. In some cases, the parties participating in a transaction may not know the identities of any other parties participating in the transaction but may nonetheless securely exchange information (e.g., using the consensus protocol). Further, the distributed ledger may correspond to a record of consensus with a cryptographic audit trail that is maintained and validated by a set of independent computers.

In general, the consensus protocol may be used to guarantee that a next transaction recorded in the distributed ledger is correct and accurate and to protect the distributed ledger from adversarial influences. For example, in some implementations, the consensus protocol used in example implementation(s) 100 to validate and record transactions in the distributed ledger may be a Proof of Work (PoW) protocol, which is based on a Merkle Tree data structure and computationally expensive hashing and peer-to-peer networking to create, broadcast, and verify transactions. In particular, according to the PoW protocol, each new transaction to be added to the distributed ledger requires a node to solve a cryptographic puzzle, and the node to solve the cryptographic puzzle first broadcasts a result to the remaining nodes. The transaction may be cryptographically signed, and the transaction is accepted in the network only if the signature is valid and verifiable (e.g., based on a public key of the signing node). Other suitable consensus protocols may include Proof of Stake, which chooses a validator to mine a next block on a basis of an economic stake that the validator has in the network, a protocol that leverages use of a trusted execution environment (TEE) to improve efficiency and/or protect against malicious behaviors (e.g., Proof of Elapsed Time, Proof of Space, and/or the like), and/or the like.

In this way, by recording the profile associated with the MEC hosts in the distributed ledger, each MEC host in the edge region of the RAN may have access to information related to the capabilities associated with the other MEC hosts in the edge region of the RAN. In this way, certain tasks that relate to managing allocation, access, coordination, and other functions can be offloaded from the MEC orchestration platform to the MEC hosts. This may further enable the distributed ledger to be used to implement smart contracts (e.g., to enforce service level agreements associated with application workloads that are assigned to certain MEC hosts), to track performance associated with the MEC hosts, to manage charging (e.g., payments to third-party MEC providers) based on where application workloads are processed, and/or the like.

As shown in FIG. 1B, and by reference number 130, the MEC orchestration platform may receive information related to a requested MEC session to support an application workload for a user equipment in communication with a base station located in the edge region of the RAN. For example, in FIG. 1B, a first user equipment 102 is in communication with a base station that is co-located with a particular MEC host, and a second user equipment 104 is in communication with a base station that does not have a co-located MEC host. In some implementations, the requests from the first user equipment 102 and the second user equipment 104 may indicate one or more performance requirements and/or other constraints associated with the requested session(s) (e.g., requirements related to latency, bandwidth, security, location, connectivity or mobility, cost, persistent storage, and/or the like), and these constraints may be evaluated by the MEC orchestration platform to determine one or more MEC hosts to be assigned to the corresponding application workloads.

In some implementations, when the MEC orchestration platform determines that the MEC hosts provided by the network operator are insufficient to meet the constraints associated with the requested MEC sessions, the MEC orchestration platform may determine that at least a portion of the application workload is to be distributed to one or more of the shared MEC hosts. For example, in the case of the first user equipment 102, the MEC orchestration platform may determine that at least a portion of the corresponding application workload is to be distributed to one or more of the shared MEC hosts based on determining that the MEC host co-located with the base station in communication with the first user equipment 102 does not have sufficient MEC resources available to meet the performance requirements of the application workload for the first user equipment. In another example, in the case of the second user equipment 104, the MEC orchestration platform may determine that at least a portion of the corresponding application workload is to be distributed to one or more of the shared MEC hosts based on determining that the base station in communication with the second user equipment 104 does not have any co-located MEC resources available to serve the second user equipment 104.

As further shown in FIG. 1B, and by reference number 135, the MEC orchestration platform may submit a work order related to a requested MEC session to the various MEC hosts located in the edge region of the RAN. For example, the work order may indicate the performance requirements and/or constraints associated with the requested MEC session. As further shown in FIG. 1B, and by reference number 140, the various MEC hosts located in the edge region of the RAN may submit bids for the work order according to an automated process based on the information contained in the distributed ledger. For example, each MEC host in the edge region of the RAN may indicate a cost to support the application workload, a performance level that can be offered to support the application workload, and/or the like, and the bids may be recorded in the distributed ledger. As further shown in FIG. 1B, and by reference number 145, the MEC orchestration platform may receive information identifying one or more bidders that can meet the performance requirements or otherwise satisfy the constraints associated with the requested MEC session. Additionally, or alternatively, the MEC orchestration platform may receive information related to each bid that was submitted and use this information to determine where to assign the application workload.

As shown in FIG. 1C, and by reference number 150, the MEC orchestration platform may assign the application workload(s) associated with the requested MEC session(s) to a set of MEC hosts that are able to provide sufficient MEC resources to support the application workload(s). For example, in some implementations, the MEC orchestration platform may assign an application workload to one or more MEC hosts that are able to provide sufficient MEC resources to support the application workload(s) at a lowest cost based on the bidding process described above. Additionally, or alternatively, the MEC orchestration platform may independently determine one or more MEC hosts that are best suited to support the application workload based on the performance requirements and/or constraints associated with the application workload, the performance metrics indicated in the profiles associated with each MEC hosts, charging rules that are in place for each of the MEC hosts, security policies that are enforced and/or enforceable by each of the MEC hosts, and/or the like. In some implementations, when a portion of an application workload is assigned to a particular MEC host, the MEC orchestration platform may cause the portion of the application workload to be transmitted to the MEC host.

In some implementations, when assigning workloads to the MEC hosts, the MEC orchestration platform may enforce one or more security measures to protect against exposing user data to the third-party providers of the shared MEC hosts. For example, in some implementations, the shared MEC hosts may be required to execute application workloads in a trusted execution environment (TEE), which is a secure area inside a main processor that runs in an isolated environment in parallel with a main operating system. The TEE may generally guarantee that any code and/or data loaded in the TEE are protected with respect to confidentiality and integrity. Accordingly, trusted applications executing in a TEE may have full access to the underlying compute resources, but hardware isolation may protect the trusted applications from user installed applications that may be running in the main operating system, and various software and cryptographic isolations inside the TEE may further protect different trusted applications that are executing in the TEE from each other.

Additionally, or alternatively, the security measures enforced by the MEC orchestration may include distributing the application workloads in a manner whereby a single shared MEC host does not receive a full application workload. In particular, to ensure that no third-party provider has access to a full block of work, the MEC orchestration platform may divide an application workload into multiple smaller portions, partitions, slices, and/or the like, and the multiple smaller portions may be distributed to different MEC hosts to prevent the MEC hosts from gaining insight into the underlying data (e.g., based on an application fingerprinting process). In some cases, the distributed ledger, the TEE, and/or another suitable mechanism can be used to enforce the data partitioning. The network operator may establish a trust relationship with the TEE running in the shared MEC host(s), and the TEE may enforce any security policies that are applied to application workloads running on the shared MEC hosts.

For example, as shown in FIG. 1C, and by reference number 152, an application workload for the first user equipment 102 includes a first portion that is assigned to the MEC host that is co-located with the base station in communication with the first user equipment 102, and a second portion that is assigned to a shared MEC host closest to the first user equipment 102. In this way, MEC resources of the MEC host that is co-located with the base station in communication with the first user equipment 102 and the shared MEC host closest to the first user equipment 102 may be aggregated to support the application workload of the first user equipment 102 while ensuring that the third-party provider does not have access to the full application workload. In another example, as shown in FIG. 1C, and by reference number 154, an application workload for the second user equipment 104 includes a first portion that is assigned to the MEC host co-located with the base station in communication with the first user equipment 102, a second portion that is assigned to a MEC host at an aggregation point associated with multiple base stations, and a third portion that is assigned to a shared MEC host closest to the second user equipment 104. In this way, MEC resources of the network operator can be aggregated with the third-party MEC resources to support the application workload of the second user equipment 104 while ensuring that the third-party provider does not have access to the full application workload.

As shown in FIG. 1D, and by reference number 160, the MEC orchestration platform may receive information related to one or more performance metrics for the MEC sessions that are processed using the aggregated MEC resources associated with the various MEC hosts located in the edge region of the RAN. For example, virtualization infrastructures associated with each MEC host, shared MEC host, and/or the like may be instrumented to monitor virtualized resources (e.g., compute resources, storage resources, networking resources, and/or the like) that are allocated to a particular application workload, report performance and fault information about the virtualized resources allocated to the particular application workload, and/or the like, and this information may be provided to the MEC orchestration platform.

As further shown in FIG. 1D, and by reference number 165, the MEC orchestration platform may compare the performance metrics received from the MEC host(s) that are supporting a particular application workload to a service level agreement (e.g., for that particular application workload, for the corresponding MEC host, and/or the like). As further shown in FIG. 1D, and by reference number 170, the MEC orchestration platform may record or otherwise process a transaction for the application workload based on whether the applicable service level agreement was met. For example, if a particular MEC host processing a particular application workload failed to provide a maximum latency that satisfies a latency requirement associated with the application workload, the recorded transaction may indicate the non-compliance with the service level agreement.

In this way, subsequent decisions regarding where to assign application workloads can be informed by whether a particular MEC host was able to comply with applicable service level agreements, and MEC hosts that are consistently unable to comply with applicable service level agreements may be suspended or terminated, while MEC hosts that are consistently able to comply with applicable service level agreements may be assigned more work. Additionally, or alternatively, charging for third-party providers may be dependent on compliance with service level agreements (e.g., third-party providers may be paid a full bid amount, and/or a bonus amount based on consistent compliance, penalized for non-compliance, and/or the like).

As further shown in FIG. 1D, and by reference number 175, the transaction may be recorded in the distributed ledger based on the consensus protocol. In this way, all MEC hosts that are operating the edge region of the RAN may be aware of the performance of other MEC hosts, which can be used to evaluate a need for infrastructure improvements (e.g., deploying more hardware resources to compete with other third-party providers), to establish consistent market rates for certain levels of performance, and/or the like.

As indicated above, FIGS. 1A-1D are provided merely as one or more examples. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
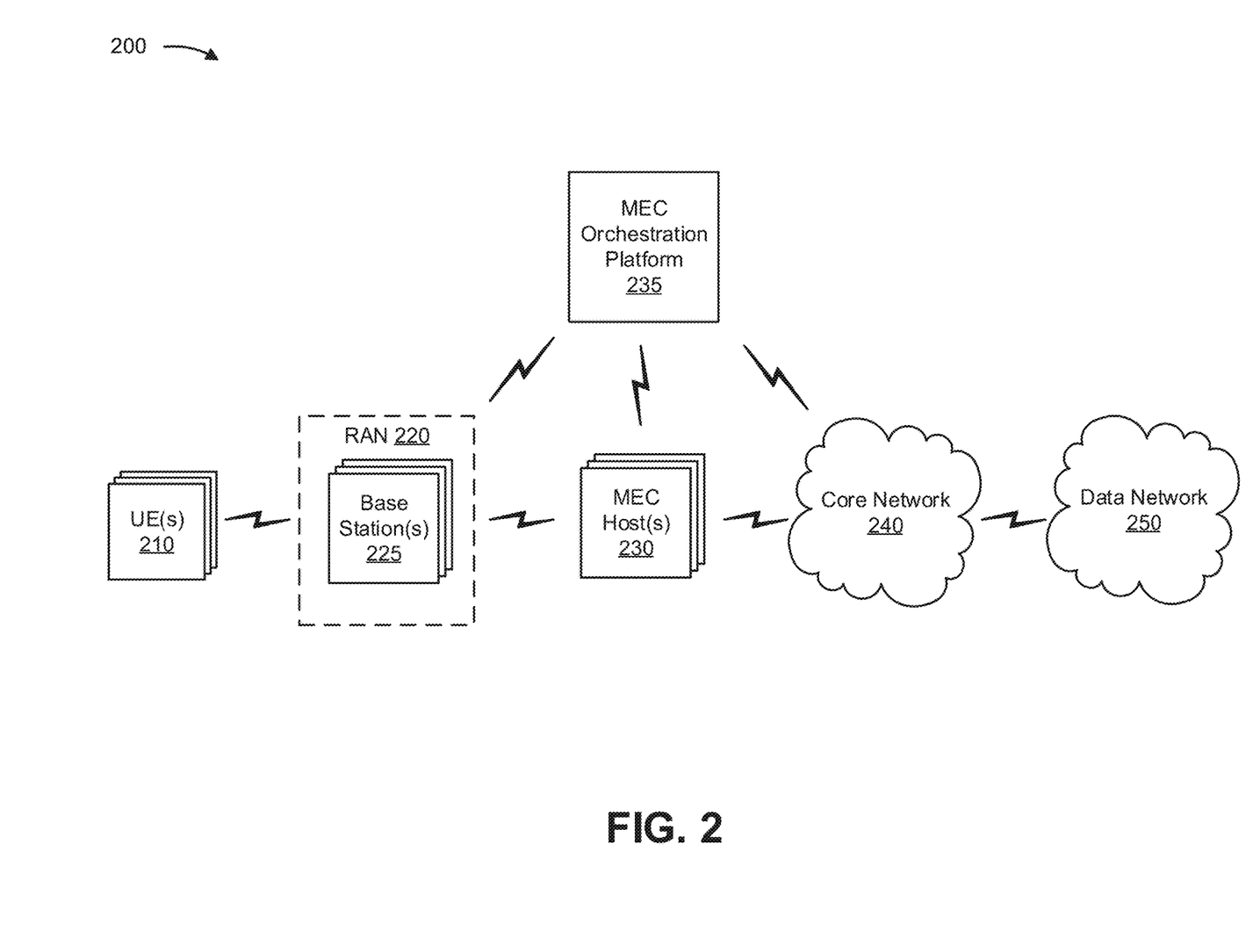
FIG. 2 is a diagram of one or more example environments in which systems, functional architectures, and/or methods described herein can be implemented.

FIG. 2 is a diagram of an example environment 200 in which systems and/or methods described herein may be implemented. As shown in FIG. 2, environment 200 may include a user equipment (UE) 210, a radio access network (RAN) 220 including a base station 225, a multi-access edge computing (MEC) host 230, a MEC orchestration platform 235, a core network 240, and a data network 250. Devices of environment 200 may interconnect via wired connections, wireless connections, or a combination of wired and wireless connections.

UE 210 includes one or more devices capable of communicating with RAN 220 and/or a data network 250 (e.g., via core network 240). For example, UE 210 may include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, an autonomous vehicle, and/or a similar device. UE 210 may be capable of communicating using uplink (e.g., UE-to-RAN) communications, downlink (e.g., RAN-to-UE) communications, and/or sidelink (e.g., UE-to-UE) communications. In some implementations, UE 210 may include a machine-type communication (MTC) UE, such as an evolved or enhanced MTC (eMTC) UE. In some implementations, UE 210 may include an Internet of things (IoT) UE, such as a narrowband IoT (NB-IoT) UE and/or the like.

RAN 220 includes one or more devices capable of communicating with UE 210 using a cellular radio access technology (RAT). For example, RAN 220 may include a base station 225, which may include a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 225 may have the same characteristics and functionality of RAN 220, and vice versa. RAN 220 may transfer traffic between UE 210 (e.g., using a cellular RAT), one or more other RANs 220 (e.g., using a wireless interface or a backhaul interface, such as a wired backhaul interface), and/or core network 240. RAN 220 may provide one or more cells that cover geographic areas. Some RANs 220 may be mobile base stations. Some RANs 220 may be capable of communicating using multiple RATs.

In some implementations, RAN 220 can perform scheduling and/or resource management for UEs 210 covered by RAN 220 (e.g., UEs 210 covered by a cell provided by RAN 220). In some implementations, RAN 220 may be controlled or coordinated by a network controller, which may perform load balancing, network-level configuration, and/or the like. The network controller may communicate with RAN 220 via a wireless or wireline backhaul. In some implementations, RAN 220 may include a network controller, a SON module or component, or a similar module or component. In other words, RAN 220 may perform network control, scheduling, and/or network management functions (e.g., for other RAN 220 and/or for uplink, downlink, and/or sidelink communications of UEs 210 covered by RAN 220). In some implementations, RAN 220 may apply network slice policies to perform the network control, scheduling, and/or network management functions. In some implementations, RAN 220 may include a central unit and multiple distributed units. The central unit may coordinate access control and communication with regard to the multiple distributed units. The multiple distributed units can provide UEs 210 and/or other RANs 220 with access to data network 250 via core network 240.

MEC host 230 includes one or more devices having computing resources (e.g., processor resources, storage resources, network resources, and/or the like) that are available to process application workloads associated with UEs 210. For example, MEC host 230 may include a MEC environment that can execute the application workloads as one or more virtual machines, containers, and/or the like on top of a virtualization infrastructure. Accordingly, the application workloads executed in the MEC environment can interact with the computing resources associated with the MEC environment to consume and/or provide MEC services. In some implementations, MEC host 230 may be located in an edge region of RAN 220. For example, MEC host 230 may be co-located with base station 225 or located in proximity to base station 225 to process application workloads closer to UEs 210 (e.g., in terms of distance and/or latency). In some implementations, MEC host 230 may be operated by a network operator associated with RAN 220 and/or a third-party provider sharing MEC resources with the network operator associated with RAN 220.

MEC orchestration platform 235 includes one or more devices configured to manage information related to application workloads that are associated with UEs 210 and processed on one or more MEC hosts located in proximity to UEs 210. For example, in some implementations, MEC orchestration platform 235 may include a system-level management component that may maintain an overall view of a MEC system (e.g., including MEC host 230 deployed in the MEC system, MEC resources that are available on MEC host 230, a topology of the MEC system, and/or the like) and a host-level management component to manage MEC functionality associated with a particular MEC host 230 and one or more application workloads that are executing on the particular MEC host 230. For example, the system-level management component may select MEC host 230 to process an application workload based on one or more constraints or performance criteria (e.g., latency, bandwidth, location, available resources, available services, and/or the like) and communicate with the host-level management component to trigger instantiation and/or termination of virtual machines, containers, and/or the like that are used to process the application workload on MEC host 230. In some implementations, MEC orchestration platform 235 may be located in core network 240 and/or located in RAN 220 to manage allocation, access, management, and coordination of application workloads among MEC hosts 230 in a particular edge region of RAN 220.

Core network 240 includes various types of core network architectures, such as a 5G Next Generation (NG) Core (e.g., core network 300 of FIG. 3), a Long-Term Evolution (LTE) Evolved Packet Core (EPC), and/or the like. In some implementations, core network 240 may be implemented on physical devices, such as a gateway, a mobility management entity, and/or the like. In some implementations, the hardware and/or software implementing core network 240 may be virtualized (e.g., through the use of network function virtualization and/or software-defined networking), thereby allowing for the use of composable infrastructure when implementing core network 240. In this way, networking, storage, and compute resources can be allocated to implement the functions of core network 240 (described with regard to FIG. 3) in a flexible manner as opposed to relying on dedicated hardware and software to implement these functions.

Data network 250 includes one or more wired and/or wireless data networks. For example, data network 250 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices)

of environment 200 may perform one or more functions described as being performed by another set of devices of environment 200.

Figure 3:
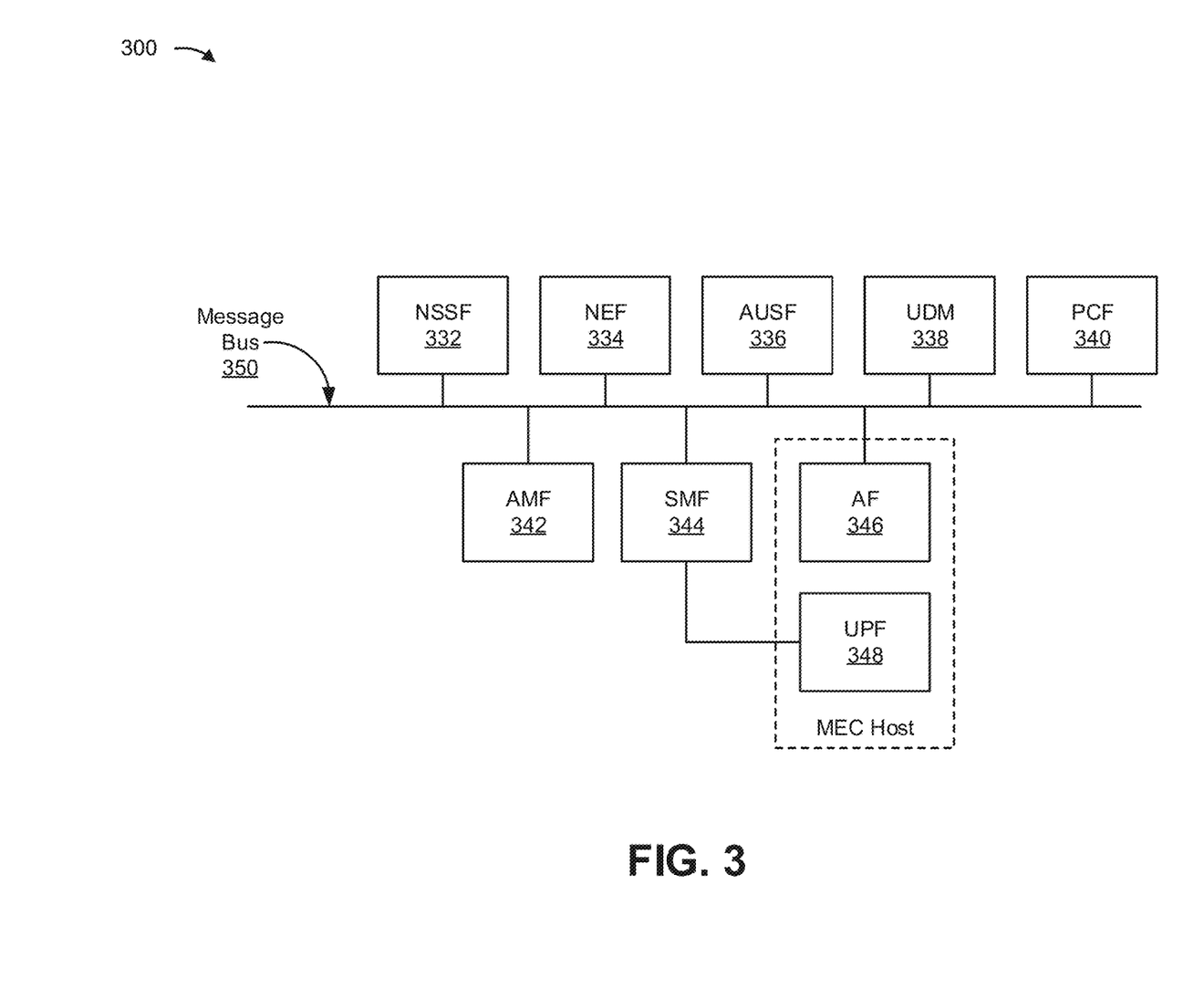
FIG. 3 is a diagram of one or more example environments in which systems, functional architectures, and/or methods described herein can be implemented.

FIG. 3 is a diagram of an example functional architecture of a core network 300 in which systems and/or methods described herein can be implemented. For example, FIG. 3 can show an example functional architecture of a 5G NG core network included in a 5G wireless telecommunications system. In some implementations, the example functional architecture can be implemented by a core network (e.g., core network 240 of FIG. 2) and/or one or more devices (e.g., a device described with respect to FIG. 4). While the example functional architecture of core network 300 shown in FIG. 3 can be an example of a service-based architecture, in some implementations, core network 300 can be implemented as a reference-point architecture.

As shown in FIG. 3, core network 300 includes a number of functional elements. The functional elements may include, for example, a Network Slice Selection Function (NSSF) 332, a Network Exposure Function (NEF) 334, an Authentication Server Function (AUSF) 336, a Unified Data Management (UDM) function 338, a Policy Control Function (PCF) 340, an Access and Mobility Management Function (AMF) 342, a Session Management Function (SMF) 344, an Application Function (AF) 346, and a User Plane Function (UPF) 348, which can be communicatively connected via a message bus 350 that can be comprised of one or more physical communication channels and/or one or more virtual communication channels. Each of the functional elements shown in FIG. 3 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 300 may be operatively connected to a RAN 220, a data network 250, and/or the like, via wired and/or wireless connections with UPF 348.

NSSF 332 may select network slice instances for user equipment(s), where NSSF 332 may determine a set of network slice policies to be applied at the RAN 220. By providing network slicing, NSSF 332 allows an operator to deploy multiple substantially independent end-to-end networks potentially with the same infrastructure. In some implementations, each network slice can be customized for different services.

NEF 334 can support the exposure of capabilities and/or events in the wireless telecommunications system to help other entities in the wireless telecommunications system discover network services and/or utilize network resources efficiently.

AUSF 336 can act as an authentication server and support the process of authenticating user equipment 210 in the wireless telecommunications system. UDM 338 can store subscriber data and profiles in the wireless telecommunications system, generate authentication and key agreement credentials, identify users, and/or the like. UDM 338 can be used for fixed access, mobile access, and/or the like, in core network 300. PCF 340 may provide a policy framework that incorporates network slicing, roaming, packet processing, mobility management, and/or the like.

AMF 342 can provide authentication and authorization of user equipment 210. SMF 344 can support the establishment, modification, and release of communications sessions in the wireless telecommunications system. For example, SMF 344 can configure traffic steering policies at UPF 348, enforce IP address allocation and policies for user equipment 210, and/or the like. AMF 342 and SMF 344 can act as a termination point for non-access stratum (NAS) signaling, mobility management, and/or the like. SMF 344 can act as a termination point for session management related to NAS signaling. RAN 220 can send information (e.g., information that identifies user equipment 210) to AMF 342 and/or SMF 344 via PCF 340.

AF 346 can determine whether user equipment 210 provides preferences for a set of network slice policies and support application influence on traffic routing, access to NEF 334, policy control, and/or the like. UPF 348 can serve as an anchor point for intra/inter radio access technology (RAT) mobility. UPF 348 can apply rules to packets, such as rules pertaining to packet routing, traffic reporting, handling user plane QoS, and/or the like. UPF 348 can determine an attribute of application-specific data that is communicated in a communications session. UPF 348 can receive information (e.g., information that identifies a communications attribute of an application) from RAN 220 via SMF 344 or an application program interface. In some implementations, AF 346 and UPF 348 may implement functionality of a MEC host. For example, a traffic routing and steering function may be performed in UPF 348, which may include an uplink classifier to divert user traffic that matches one or more traffic filters controlled by SMF 344 to a local data plane. Furthermore, PCF 340 and SMF 344 may set one or more policies to influence the traffic routing in UPF 348 based on information provided by AF 346.

Message bus 350 represents a communication structure for communication among the functional elements. In other words, message bus 350 can permit communication between two or more functional elements. Message bus 350 can be a message bus, HTTP/2 proxy server, and/or the like.

RAN 220 may be operatively connected, via a wired and/or wireless connection, to core network 300 through UPF 348. RAN 220 may facilitate communications sessions between UEs 210 and data network 250 by communicating application-specific data between RAN 220 and core network 300.

The number and arrangement of functional elements shown in FIG. 3 are provided as one or more examples. In practice, there can be additional functional elements, fewer functional elements, different functional elements, or differently arranged functional elements than those shown in FIG. 3. Furthermore, two or more functional elements shown in FIG. 3 can be implemented within a single device, or a single functional element shown in FIG. 3 can be implemented as multiple, distributed devices. Additionally, or alternatively, a set of functional elements (e.g., one or more functional elements) of core network 300 can perform one or more functions described as being performed by another set of functional elements of core network 330.

Figure 4:
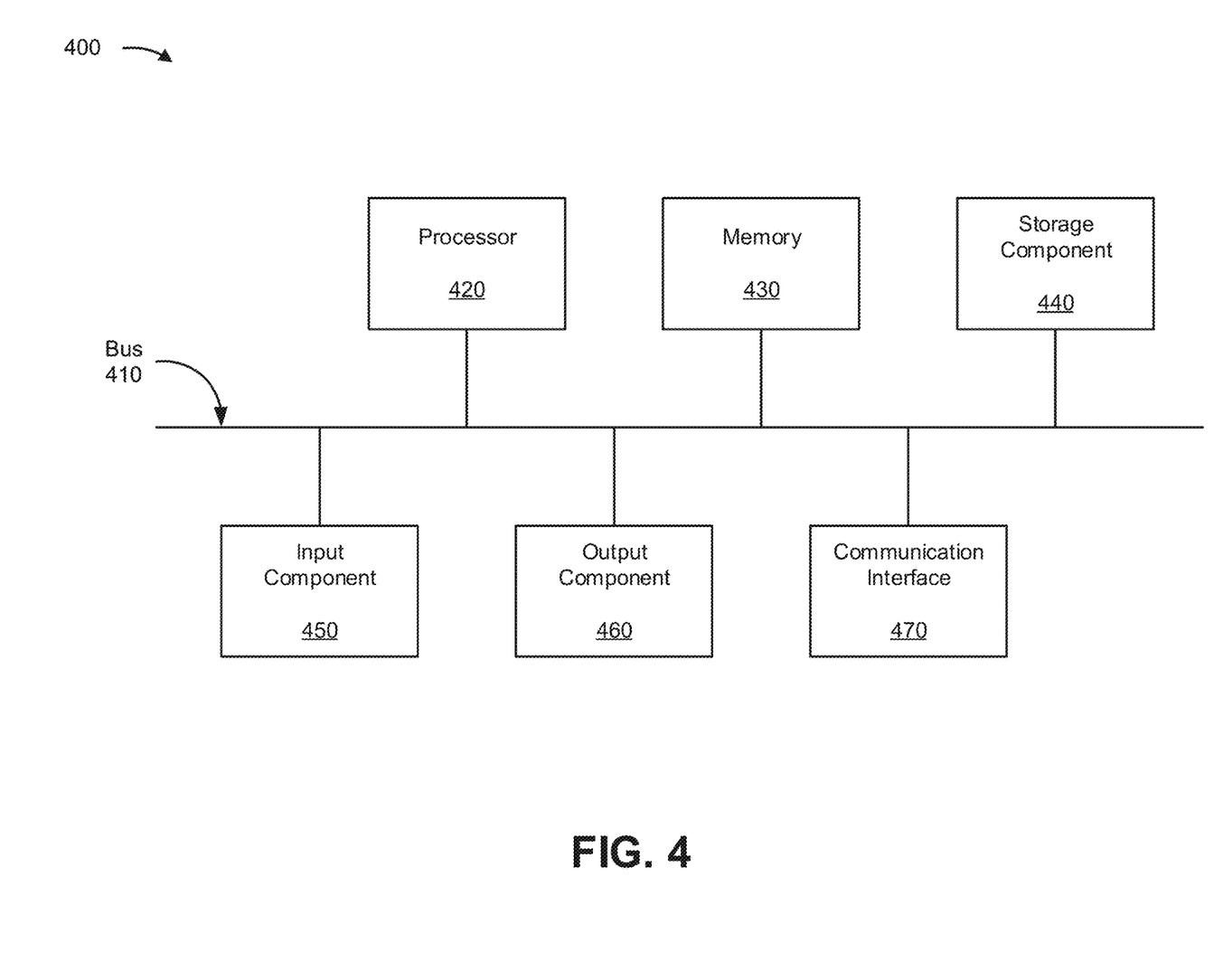
FIG. 4 is a diagram of example components of one or more devices of FIGS. 2-3.

FIG. 4 is a diagram of example components of a device 400. Device 400 may correspond to user equipment 210, base station 225, MEC host 230, MEC orchestration platform 235, NSSF 332, NEF 334, AUSF 336, UDM 338, PCF 340, AMF 342, SMF 344, AF 346, and/or UPF 348. In some implementations, user equipment 210, base station 225, MEC host 230, MEC orchestration platform 235, NSSF 332, NEF 334, AUSF 336, UDM 338, PCF 340, AMF 342, SMF 344, AF 346, and/or UPF 348 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
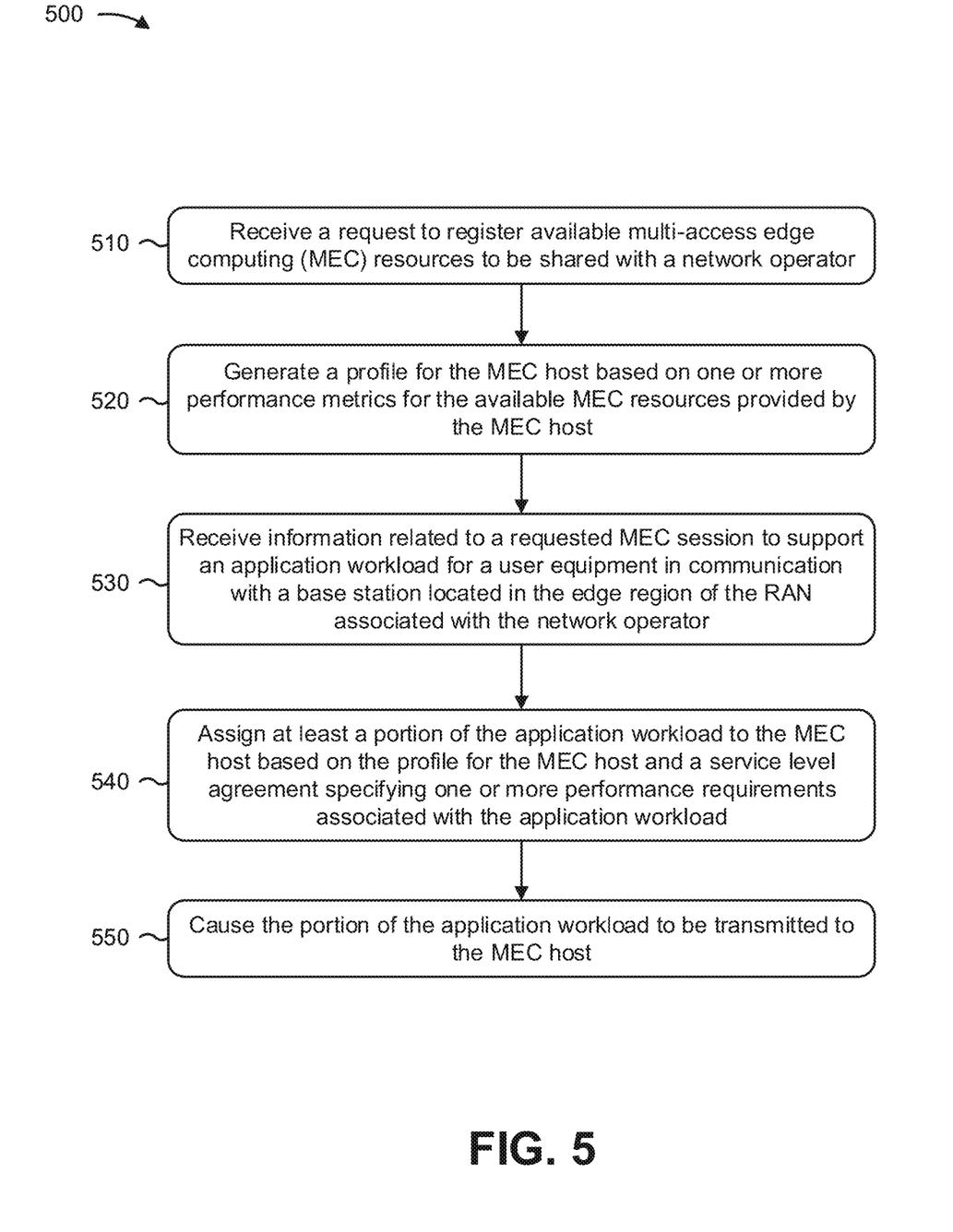
FIG. 5 is a flow chart of an example process for sharing multi-access edge computing resources in a wireless network.

FIG. 5 is a flow chart of an example process 500 for sharing multi-access edge computing (MEC) resources in a wireless network. In some implementations, one or more process blocks of FIG. 5 may be performed by a MEC orchestration device (e.g., MEC orchestration platform 235), which may be located in a core network associated with a network operator or an edge region of a radio access network (RAN) associated with the network operator. In some implementations, one or more process blocks of FIG. 5 may be performed by another device or a group of devices separate from or including the MEC orchestration device, such as a user equipment (e.g., user equipment 210), a base station (e.g., base station 225), a MEC host (e.g., MEC host 230), a core network element (e.g., NSSF 332, NEF 334, AUSF 336, UDM 338, PCF 340, AMF 342, SMF 344, AF 346, UPF 348, and/or the like), and/or the like.

As shown in FIG. 5, process 500 may include receiving a request to register available MEC resources to be shared with a network operator (block 510). For example, the MEC orchestration device (e.g., using processor 420, memory 430, storage component 440, input component 450, output component 460, communication interface 470, and/or the like) may receive a request to register available MEC resources to be shared with a network operator, as described above. In some implementations, the available MEC resources may be provided by a provider operating a MEC host located in an edge region of a radio access network (RAN) associated with the network operator.

As further shown in FIG. 5, process 500 may include generating a profile for the MEC host based on one or more performance metrics for the available MEC resources provided by the MEC host (block 520). For example, the MEC orchestration device (e.g., using processor 420, memory 430, storage component 440, input component 450, output component 460, communication interface 470, and/or the like) may generate a profile for the MEC host based on one or more performance metrics for the available MEC resources provided by the MEC host, as described above. In some implementations, the MEC orchestration device may cause one or more test workloads to be executed on the MEC host to determine the one or more performance metrics for the available MEC resources, and the profile for the available MEC resources may be generated based on the one or more performance metrics for the available MEC resources satisfying a condition.

Accordingly, in some implementations, the MEC orchestration device may aggregate information related to the available MEC resources provided by the MEC host with information related to a set of available MEC resources provided by the network operator in the edge region of the RAN such that the application workload may be distributed among the aggregated MEC resources that are available in the edge region of the RAN (e.g., using the MEC resources to be shared with the network operator and/or available MEC resources, if any, provided by the network operator in the edge region of the RAN). For example, a portion of the application workload may be assigned to the MEC host providing the available MEC resources to be shared with the network operator based on one or more conditions (e.g., that the set of available MEC resources provided by the network operator in the edge region of the RAN are insufficient to satisfy the one or more performance requirements associated with the application workload, that the network operator does not provide any MEC resources in the edge region of the RAN, and/or the like).

In some implementations, the MEC orchestration device may transmit, to a set of MEC hosts located in the edge region of the RAN, a request to register the profile for the available MEC resources to permit the set of MEC hosts to independently record a transaction to register the profile for the available MEC resources in a local copy of a distributed ledger based on a consensus protocol.

As further shown in FIG. 5, process 500 may include receiving information related to a requested MEC session to support an application workload for a user equipment in communication with a base station located in the edge region of the RAN associated with the network operator (block 530). For example, the MEC orchestration device (e.g., using processor 420, memory 430, storage component 440, input component 450, output component 460, communication interface 470, and/or the like) may receive information related to a requested MEC session to support an application workload for a user equipment in communication with a base station located in the edge region of the RAN associated with the network operator, as described above.

As further shown in FIG. 5, process 500 may include assigning at least a portion of the application workload to the MEC host based on the profile for the MEC host and a service level agreement specifying one or more performance requirements associated with the application workload (block 540). For example, the MEC orchestration device (e.g., using processor 420, memory 430, storage component 440, input component 450, output component 460, communication interface 470, and/or the like) may assign at least a portion of the application workload to the MEC host based on the profile for the MEC host and a service level agreement specifying one or more performance requirements associated with the application workload, as described above. In some implementations, the portion of the application workload may be assigned to the MEC host based on a bid to service the application workload from the MEC host. For example, the bid may indicate an offered cost for executing the portion of the application workload using the available MEC resources provided by the MEC host, an offered quality of service for executing the portion of the application workload using the available MEC resources provided by the MEC host, and/or the like.

As further shown in FIG. 5, process 500 may include causing the portion of the application workload to be transmitted to the MEC host (block 550). For example, the MEC orchestration device (e.g., using processor 420, memory 430, storage component 440, input component 450, output component 460, communication interface 470, and/or the like) may cause, by the MEC orchestration device, the portion of the application workload to be transmitted to the MEC host, as described above. In some implementations, the portion of the application workload transmitted to the MEC host may be executed using one or more hardware processors that execute the portion of the application workload in a trusted execution environment.

In some implementations, the MEC orchestration device may further transmit, to a set of MEC hosts located in the edge region of the RAN, a request to record a transaction for the portion of the application workload assigned to the MEC host in a distributed ledger. For example, the transaction may indicate whether one or more actual performance metrics for the portion of the application workload assigned to the MEC host satisfy the one or more performance requirements specified in the service level agreement. For example, in some implementations, the transaction for the portion of the application workload assigned to the MEC host may be processed based on an offered cost indicated in a bid for the application workload, a degree to which one or more actual performance metrics for the application workload met an offered quality of service, and/or the like.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a multi-access edge computing (MEC) orchestration device, a request to register available MEC resources to be shared with a network operator, wherein the available MEC resources are provided by a provider operating a MEC host located in an edge region of a radio access network (RAN) associated with the network operator;
    generating, by the MEC orchestration device, a profile for the MEC host based on one or more performance metrics for the available MEC resources provided by the MEC host;
    receiving, by the MEC orchestration device, information related to a requested MEC session to support an application workload for a user equipment in communication with a base station located in the edge region of the RAN associated with the network operator;
    assigning, by the MEC orchestration device, at least a portion of the application workload to the MEC host based on the profile for the MEC host and a service level agreement specifying one or more performance requirements associated with the application workload; and
    causing, by the MEC orchestration device, the portion of the application workload to be transmitted to the MEC host.

2. The method of claim 1, further comprising:
    causing one or more test workloads to be executed on the MEC host to determine the one or more performance metrics for the available MEC resources,
        wherein a profile for the available MEC resources is generated based on the one or more performance metrics for the available MEC resources satisfying a condition.

3. The method of claim 1, further comprising:
    aggregating information related to the available MEC resources provided by the MEC host with information related to a set of available MEC resources provided by the network operator in the edge region of the RAN,
        wherein the portion of the application workload assigned to the MEC host is a first portion of the application workload; and
    assigning a second portion of the application workload to the set of available MEC resources provided by the network operator in the edge region of the RAN.

4. The method of claim 3, wherein the first portion of the application workload is assigned to the MEC host based on determining that the set of available MEC resources provided by the network operator in the edge region of the RAN are insufficient to satisfy the one or more performance requirements associated with the application workload.

5. The method of claim 1, further comprising:
    transmitting, to a set of MEC hosts located in the edge region of the RAN, a request to register a profile for the available MEC resources to permit the set of MEC hosts to independently record a transaction to register the profile for the available MEC resources in a local copy of a distributed ledger based on a consensus protocol.

6. The method of claim 1, wherein the MEC orchestration device is located in one or more of a core network associated with the network operator or the edge region of the RAN associated with the network operator.

7. The method of claim 1, further comprising:
    transmitting, to a set of MEC hosts located in the edge region of the RAN, a request to record a transaction for the portion of the application workload assigned to the MEC host in a distributed ledger,
        wherein the transaction recorded in the distributed ledger indicates whether one or more actual performance metrics for the portion of the application workload assigned to the MEC host satisfy the one or more performance requirements specified in the service level agreement.

8. The method of claim 1, wherein the portion of the application workload is assigned to the MEC host based on a bid to service the application workload from the MEC host.

9. An orchestration device, comprising:
    one or more memories; and
    one or more processors, communicatively coupled to the one or more memories, to:
        aggregate information related to a set of multi-access edge computing (MEC) resources that are shared with a network operator in an edge region of a radio access network (RAN),
            wherein the set of MEC resources shared with the network operator are provided by one or more providers operating one or more MEC hosts located in the edge region of the RAN;
        receive information related to a requested MEC session to support an application workload for a user equipment in communication with a base station located in the edge region of the RAN associated with the network operator;
        assign at least a portion of the application workload to the set of MEC resources that are shared with the network operator based on one or more performance requirements associated with the application workload; and
        cause the portion of the application workload to be transmitted to the set of MEC resources that are shared with the network operator.

10. The orchestration device of claim 9, wherein the one or more processors are further to:
cause one or more test workloads to be executed on the one or more MEC hosts to determine one or more performance metrics for the set of MEC resources that are shared with the network operator,
wherein the portion of the application workload is assigned to the set of MEC resources that are shared with the network operator based on determining that the one or more performance metrics for the set of MEC resources can satisfy the one or more performance requirements associated with the application workload.

11. The orchestration device of claim 9, wherein the one or more processors are further to:
transmit, to a set of MEC hosts in the edge region of the RAN, a request to register one or more profiles for the one or more MEC hosts providing the set of MEC resources to permit the set of MEC hosts to independently record the one or more profiles in a local copy of a distributed ledger based on a consensus protocol.

12. The orchestration device of claim 9, wherein the one or more processors are further to:
transmit, to a set of MEC hosts in the edge region of the RAN, a request to record a transaction for the portion of the application workload assigned to the set of MEC resources in a distributed ledger to permit the set of MEC hosts to independently record the transaction in a local copy of the distributed ledger based on a consensus protocol.

13. The orchestration device of claim 12, wherein the transaction indicates whether one or more actual performance metrics for the portion of the application workload satisfy the one or more performance requirements associated with the application workload.

14. The orchestration device of claim 9, wherein the set of MEC resources include one or more hardware processors configured to execute the portion of the application workload assigned to the one or more MEC hosts in a trusted execution environment.

15. A non-transitory computer-readable medium storing instructions, the instructions comprising:
one or more instructions that, when executed by one or more processors, cause the one or more processors to:
receive a request to register available MEC resources to be shared with a network operator,
wherein the available MEC resources are provided by a MEC host located in an edge region of a radio access network (RAN) associated with the network operator, and
wherein the request indicates one or more performance capabilities for the available MEC resources to be shared with the network operator;
cause one or more test workloads to be executed on the MEC host to determine one or more performance metrics for the available MEC resources,
wherein a profile for the available MEC resources is generated based on the one or more performance metrics for the available MEC resources and the one or more performance capabilities indicated in the request;
receive information related to a requested MEC session to support an application workload for a user equipment in communication with a base station located in the edge region of the RAN associated with the network operator; and
assign a portion of the application workload to the MEC host based on a profile for the MEC host indicating that the one or more performance metrics for the available MEC resources or the one or more performance capabilities indicated in the request are sufficient to satisfy one or more performance requirements associated with the application workload.

16. The non-transitory computer-readable medium of claim 15, wherein the one or more instructions, when executed by the one or more processors, further cause the one or more processors to:
aggregate information related to the available MEC resources provided by the MEC host with information related to a set of available MEC resources provided by the network operator in the edge region of the RAN,
wherein the portion of the application workload is assigned to the MEC host based on determining that the set of available MEC resources provided by the network operator in the edge region of the RAN are insufficient to satisfy the one or more performance requirements associated with the application workload.

17. The non-transitory computer-readable medium of claim 15, wherein the request is a first request, and wherein the one or more instructions, when executed by the one or more processors, further cause the one or more processors to:
transmit, to a set of MEC hosts located in the edge region of the RAN, a second request to register one or more of the profile for the available MEC resources or a transaction for the portion of the application workload assigned to the MEC host in a distributed ledger.

18. The non-transitory computer-readable medium of claim 17, wherein the second request causes the set of MEC hosts to independently register the profile or the transaction in a local copy of the distributed ledger based on a consensus protocol.

19. The non-transitory computer-readable medium of claim 15, wherein the portion of the application workload is assigned to the MEC host based on a bid from the MEC host indicating one or more of an offered cost or an offered quality of service for executing the portion of the application workload using the available MEC resources provided by the MEC host.

20. The non-transitory computer-readable medium of claim 19, wherein the one or more instructions, when executed by the one or more processors, further cause the one or more processors to:
process a transaction for the portion of the application workload assigned to the MEC host based on one or more of the offered cost indicated in the bid or a degree to which one or more actual performance metrics for the application workload met the offered quality of service.

* * * * *